(12) United States Patent
Endo

(10) Patent No.: US 7,404,291 B2
(45) Date of Patent: Jul. 29, 2008

(54) EXHAUST GAS PURIFYING APPARATUS FOR INTERNAL COMBUSTION ENGINE

(75) Inventor: Masatoshi Endo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 87 days.

(21) Appl. No.: 11/455,801

(22) Filed: Jun. 20, 2006

(65) Prior Publication Data

US 2006/0288693 A1    Dec. 28, 2006

(30) Foreign Application Priority Data

Jun. 22, 2005    (JP)  ............................. 2005-181561

(51) Int. Cl.
*F01N 3/00*    (2006.01)
(52) U.S. Cl. ..................... 60/297; 60/274; 60/277; 60/284; 60/295; 73/118.1
(58) Field of Classification Search ............... 60/274, 60/276, 277, 284, 295, 297, 311; 73/118.1, 73/118.2
See application file for complete search history.

(56) References Cited

U.S. PATENT DOCUMENTS

| | | | | |
|---|---|---|---|---|
| 4,531,363 A | * | 7/1985 | Ludecke et al. | 60/303 |
| 4,835,964 A | * | 6/1989 | Kume et al. | 60/285 |
| 6,035,835 A | * | 3/2000 | Shigihama et al. | 123/568.16 |
| 6,192,866 B1 | * | 2/2001 | Araki et al. | 123/479 |
| 6,945,035 B2 | * | 9/2005 | Hirooka et al. | 60/289 |

FOREIGN PATENT DOCUMENTS

| | | | | |
|---|---|---|---|---|
| DE | 4326351 | | 2/1994 | |
| DE | 19712797 | | 10/1997 | |
| JP | 11-132026 | | 5/1999 | |
| JP | 2003-155920 A | | 5/2003 | |
| JP | 2005090451 A | * | 4/2005 | ................. 60/295 |

* cited by examiner

*Primary Examiner*—Binh Q Tran
(74) *Attorney, Agent, or Firm*—Arent Fox LLP

(57) ABSTRACT

An exhaust gas purifying apparatus for an internal combustion engine, including a filter provided in an exhaust system of the engine for trapping particulates in exhaust gases, and a pressure difference sensor for detecting a pressure difference between an upstream side pressure of the filter and a downstream side pressure of the filter. A non-frozen state of the pressure difference sensor is determined based on at least one of a first parameter relevant to an exhaust gas temperature of the engine and a second parameter relevant to an atmospheric temperature. An abnormality of the filter is determined based on a result of the non-frozen state determination.

12 Claims, 2 Drawing Sheets

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly, to an exhaust gas purifying apparatus having a diesel particulate filter (hereinafter referred to as "DPF") which traps particulates, i.e., particulate matter, in exhaust gases.

2. Description of the Related Art

In an internal combustion engine, particularly, in a diesel engine, a DPF is conventionally and widely used to trap particulates or particulate matter existing in exhaust gases. Since there is a limit to the amount of particulates that can be trapped in the DPF, the amount of particulates accumulated in the DPF must be estimated. Accordingly, the regeneration process for burning the particulates is performed when the estimated amount of particulate accumulation reaches a predetermined threshold value.

Japanese Patent Laid-open No. 2003-155920 (JP '920) discloses a device which detects a pressure difference between an upstream side pressure and a downstream side pressure of the DPF, and then determines if there is a failure, such as a blockage or a leak of the DPF, based on the detected pressure difference.

The pressure difference sensor for detecting the above-described pressure difference is disposed in a passage (hereinafter referred to as "pressure difference detection passage") which is provided for detecting the pressure difference and which connects the upstream side and the downstream side of the DPF. Accordingly, if water in the pressure difference detection passage freezes, an abnormal rise or an abnormal fall of the pressure difference may be detected. Further, when the pressure difference sensor itself freezes, the detected pressure difference may take an abnormal value. In this specification, the frozen state, including the frozen water in the pressure difference detection passage, is hereinafter referred to as "frozen state of the pressure difference sensor". Since such a frozen state is not considered in the device disclosed by JP '920, the device may erroneously determine that the DPF has failed, i.e., is abnormal, in the frozen state of the pressure difference sensor, even though the DPF has not failed.

SUMMARY OF THE INVENTION

The present invention was attained with the above concerns in mind. An aspect of the present invention is to provide an exhaust gas purifying apparatus for an internal combustion engine which prevents an erroneous determination of abnormality of the DPF in the frozen state of the pressure difference sensor that detects the pressure difference between the upstream side pressure and the downstream side pressure of the DPF.

The present invention provides an exhaust gas purifying apparatus for an internal combustion engine including a filter, a pressure difference sensor, non-frozen state determining means, and abnormality determining means. The filter is provided in an exhaust system of the engine and traps particulates in exhaust gases. The pressure difference sensor detects a pressure difference between an upstream side pressure and a downstream side pressure of the filter. The non-frozen state determining means determines a non-frozen state of the pressure difference sensor based on at least one of a first parameter relevant to an exhaust gas temperature of the engine and a second parameter relevant to an atmospheric temperature. The abnormality determining means determines an abnormality of the filter using a determination result obtained by the non-frozen state determining means.

The above-described "non-frozen state of the pressure difference sensor" is defined as a state where the pressure difference sensor itself, and any water in the pressure difference detection passage, are not frozen.

With the above-described structural configuration, the non-frozen state of the pressure difference sensor is determined based on at least one of the first parameter relevant to the exhaust gas temperature of the engine and the second parameter relevant to the atmospheric temperature. The determination of any abnormality of the filter is performed using the determination result of the non-frozen state. The temperature of the pressure difference sensor rises if the engine operates and exhaust gases flow. Therefore, even if the pressure difference sensor is in the frozen state, the frozen state will shift to the non-frozen state if the engine continues to operate for a predetermined period. Also, by detecting the atmospheric temperature, the condition can be determined where the pressure difference sensor hardly or rarely freezes, e.g., during summer. Consequently, the non-frozen state of the pressure difference sensor can accurately be determined by using the parameter relevant to the exhaust gas temperature and/or the parameter relevant to the atmospheric temperature. An erroneous determination due to the frozen state is prevented by performing the abnormality determination of the filter based on the determination result of whether the pressure difference sensor is in the non-frozen state.

Preferably, the non-frozen state determining means determines that the pressure difference sensor is in the non-frozen state when a condition, wherein the first parameter (TE) relevant to the exhaust gas temperature is equal to or greater than a reference value (T2), continues over a predetermined time period (t2).

With the above-described structural configuration, when the condition, wherein the first parameter relevant to the exhaust gas temperature is equal to or greater than the reference value, continues over the predetermined period of time, it is determined that the pressure difference sensor is in the non-frozen state. The condition, wherein the parameter relevant to exhaust gas temperature is equal to or greater than the reference value, corresponds to the engine operating condition wherein the load on the engine is comparatively high. Therefore, even if the pressure difference sensor is in the frozen state, the frozen state shifts to the non-frozen state by setting the predetermined time period with appropriate allowance. Accordingly, the abnormality determination is performed more accurately.

Preferably, the abnormality determining means determines that the filter is abnormal when the pressure difference sensor is determined to be in the non-frozen state, and the output (DP) of the pressure difference sensor is greater than a reference upper limit value (DPLH) or less than a reference lower limit value (DPLL).

With the above-described structural configuration, when the pressure difference sensor is determined to be in the non-frozen state, and the output of the pressure difference sensor is greater than the reference upper limit value or less than the reference lower limit value, the filter is determined to be abnormal. By determining abnormality when the pressure difference sensor is in the non-frozen state, an erroneous determination in the frozen state of the pressure difference sensor that a blockage or a leak is present in the DPF can be prevented.

Preferably, the exhaust gas purifying apparatus further includes fail-safe process means. The fail-safe process means inhibits a regeneration process that burns the particulates trapped in the filter when the output (DP) of the pressure difference sensor is greater than the reference upper limit value (DPLH) or less than the reference lower limit value (DPLL). Further, the abnormality determining means sends an abnormality signal to the driver of the vehicle driven by the engine when the filter is determined to be abnormal.

With the above-described structural configuration, the fail-safe process that inhibits the regeneration process for burning the particulates trapped in the filter is executed when the output of the pressure difference sensor is greater than the reference upper limit value or less than the reference lower limit value. Therefore, the regeneration process is prevented from being perfomed in a condition wherein the actual particulate accumulation amount is too little, or in a condition wherein the actual particulate accumulation amount is too great or excessive. The fail-safe process can prevent abnormal temperature rise in the DPF or degradation of the fuel consumption and the exhaust characteristics of the engine. Further, when it is determined that the pressure difference sensor is in the non-frozen state and the filter is abnormal, the driver is notified about the abnormality. Accordingly, the driver can avoid needless insecurity when the pressure difference sensor is in the frozen state.

DETAILED DESCRIPTION OF THE PREFERRED EMBODIMENTS

Preferred embodiments of the present invention will now be described with reference to the drawings.

Figure 1:
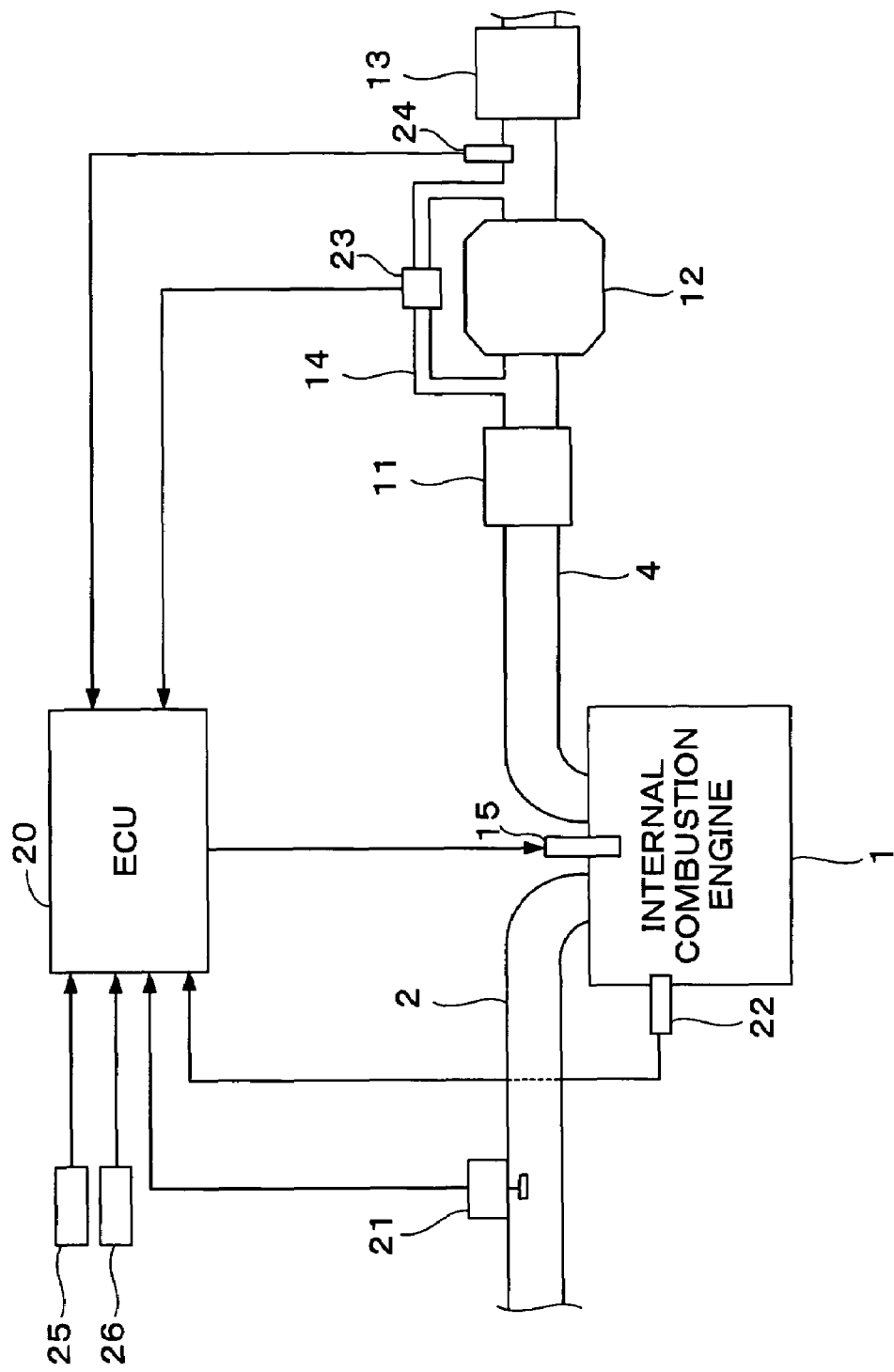
FIG. 1 is a schematic diagram showing a configuration of an internal combustion engine and a control system therefor according to an embodiment of the present invention.

FIG. 1 is a schematic diagram showing a configuration of an internal combustion engine provided with an exhaust gas purifying apparatus and a control system therefor according to an embodiment of the present invention. The internal combustion engine (hereinafter referred to as "engine 1") is a diesel engine wherein fuel is directly injected into cylinders, each cylinder being provided with a corresponding fuel injection valve 15. Each fuel injection valve 15 is electrically connected to an electronic control unit 20 (hereinafter referred to as "ECU 20") which controls a valve opening period and a valve opening timing of the fuel injection valve 15.

The engine 1 has an intake pipe 2 and an exhaust pipe 4. The exhaust pipe 4 is sequentially provided with a catalytic converter 11 for purifying exhaust gases, a DPF 12, and a silencer 13 starting from the upstream side. The catalytic converter 11 contains an oxidation catalyst for accelerating oxidization of any hydrocarbon and carbon monoxide in the exhaust gases. Further, the catalytic converter 11 may include a NOx adsorbent and a catalyst for reducing NOx.

The DPF 12 traps soot, which consists of particulates whose main component is carbon (C), in the exhaust gases when the exhaust gases pass through small holes in the filter wall. Specifically, the inflowing soot is accumulated on the surface of the filter wall and in the small holes in the filter wall. For example, ceramics, such as silicon carbide (SiC) or porous metal, are used as materials for the filter wall.

If the DPF 12 traps soot up to the upper limit of the soot trapping capacity, i.e., to the accumulation limit, the exhaust pressure rises excessively. Therefore, it is necessary to timely perform the regeneration process of burning trapped soot. In the regeneration process, post injection is performed to raise the temperature of exhaust gases to the temperature at which soot burns. The post injection is performed during an exhaust stroke via the fuel injection valve 15. The fuel injected by the post injection burns in the catalytic converter 11, which raises the temperature of the exhaust gases flowing into the DPF 12.

Further, the intake pipe 2 is provided with an intake air flow rate sensor 21 for detecting an intake air flow rate GA of the engine 1. A coolant temperature sensor 22 for detecting a coolant temperature TW is mounted on the body of the engine 1. A passage 14 (hereinafter referred to as "pressure difference detection passage 14"), bypassing the DPF 12, is provided for detecting a pressure difference. The pressure difference detection passage 14 is provided with a pressure difference sensor 23 for detecting a pressure difference DP between the upstream side pressure and the downstream side pressure of the DPF 12. Further, an exhaust gas temperature sensor 24 for detecting an exhaust gas temperature TE is disposed downstream of the DPF 12. The detection signals from the sensors 21-24 are supplied to the ECU 20. A crank angle position sensor 25 for detecting a rotational angle of the crankshaft of the engine 1 and an atmospheric temperature sensor 26 for detecting an atmospheric temperature TA are provided, and the detection signals from these sensors are also supplied to the ECU 20. The rotational speed NE of the engine 1 is calculated from the output of the crank angle position sensor 25.

Further, other sensors (not shown), for example, an accelerator sensor, an atmospheric pressure sensor, a vehicle speed sensor, and the like, are provided. The accelerator sensor detects a depression amount AP of the accelerator pedal of the vehicle driven by the engine 1, the atmospheric pressure sensor detects an atmospheric pressure PA, and the vehicle speed sensor detects a running speed VP of the vehicle. The detection signals of these sensors are also supplied to the ECU 20.

The ECU 20 includes an input circuit, a central processing unit (hereinafter referred to as "CPU"), a memory circuit, and an output circuit. The input circuit performs numerous functions, including shaping the waveforms of input signals from the various sensors, correcting the voltage levels of the input signals to a predetermined level, and converting analog signal values into digital signal values. The memory circuit preliminarily stores various operating programs to be executed by the CPU and stores the results of computations, and the like, performed by the CPU. The output circuit supplies control signals to the fuel injection valves 15, and the like.

The ECU 20 determines the non-frozen state of the pressure difference sensor 23 (and the pressure difference detection passage 14), and detects an abnormality such as a blockage or a leak in the DPF 12 based on the pressure difference DP detected by the pressure difference sensor 23. Specifically, when the pressure difference DP is greater than a reference upper limit value DPLH, or less than a reference lower limit value DPLL, an abnormality may have occurred. Accordingly, a fail-safe action is performed. However, when it is not determined that the pressure difference sensor 23 is in the non-frozen state, an error notification signal is not provided to the driver. When it is determined that the pressure difference sensor 23 is in the non-frozen state, and the pressure difference DP is greater than the reference upper limit value DPLH or less than the reference lower limit value DPLL, the error notification signal is provided to the driver.

Figure 2:
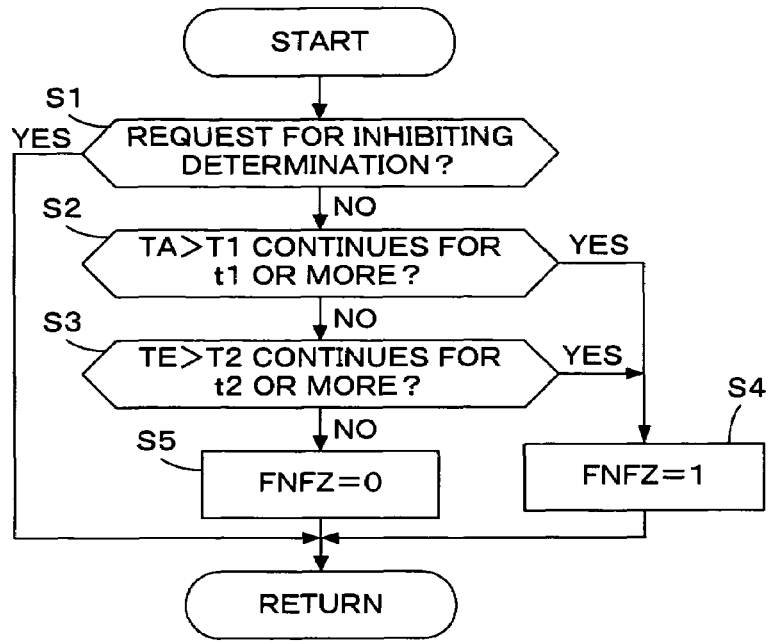
FIG. 2 is a flowchart of a process for determining the non-frozen state of the pressure difference sensor.

FIG. 2 is a flowchart of a process for determining the non-frozen state of the pressure difference sensor 23 that is executed by the CPU in the ECU 20 at predetermined time intervals.

In step S1, it is determined whether there is a request for inhibiting the determination of the non-frozen state. For example, when an abnormality of the exhaust gas temperature sensor 24 or the atmospheric temperature sensor 26 has been detected, the non-frozen state of the pressure difference sensor 23 cannot be accurately determined. Accordingly, a request for inhibiting the determination is issued. If the request for inhibiting the determination has been issued, the process ends immediately.

If the request for inhibiting the determination is not issued, it is determined whether a condition, wherein the atmospheric temperature TA is higher than a predetermined atmospheric temperature T1 (for example, 10 degrees centigrade to 20 degrees centigrade), has continued over a first predetermined time period t1 (for example, a few seconds) or more (step S2). If the answer to step S2 is negative (NO), it is determined whether the condition, wherein the exhaust gas temperature TE is higher than a predetermined exhaust gas temperature T2 (for example, 400 degrees centigrade), has continued over a second predetermined time period t2 (for example, a few minutes) or more (step S3).

If the answer to step S2 or S3 is affirmative (YES), it is determined that the pressure difference sensor 23 is in the non-frozen state, and a non-freeze flag FNFZ is set to "1" (step S4). If the answer to step S2 is affirmative (YES), indicating the condition, wherein the freeze cannot take place (for example, in summer), the pressure difference sensor 23 is determined to be in the non-frozen state. If the answer to step S3 is affirmative (YES), this indicates that the condition, wherein the engine 1 operates in a comparatively high load operating condition, has continued over the second predetermined time period t2 or more. Accordingly, even if the pressure difference sensor 23 (or the pressure difference detection passage 14) is in the frozen state at first, it is considered that the frozen state shifts to the non-frozen state. Therefore, the pressure difference sensor 23 is determined to be in the non-frozen state.

On the other hand, if both of the answers to steps S2 and S3 are negative (NO), the pressure difference sensor 23 cannot be determined to be in the non-frozen state (a possibility of the frozen state cannot be eliminated). Accordingly, the non-freeze flag FNFZ is set to "0" (step S5).

Figure 3:
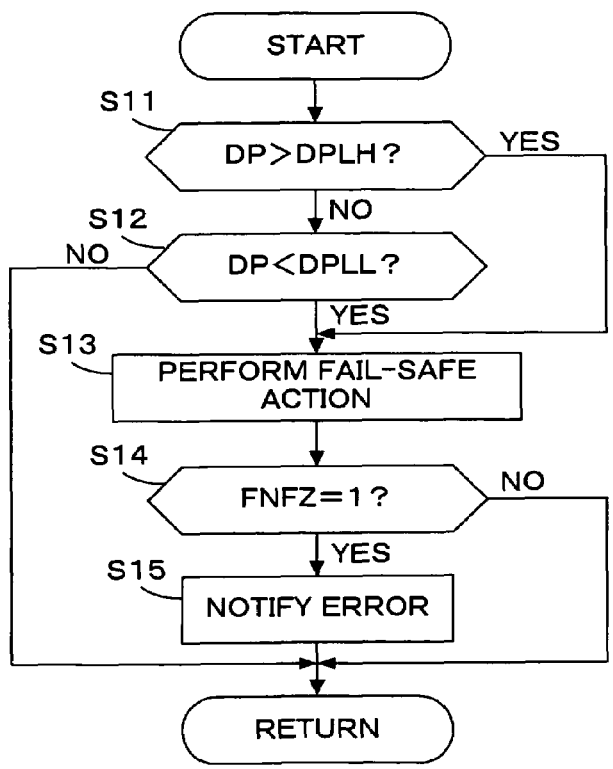
FIG. 3 is a flowchart of a process for determining the abnormality of the DPF.

FIG. 3 is a flowchart of a process for detecting abnormality of the DPF 12 that is executed by the CPU of the ECU 20 at predetermined time intervals.

In step S11, it is determined whether the pressure difference DP is greater than the reference upper limit value DPLH. If the answer to step S11 is negative (NO), it is further determined whether the pressure difference DP is less than the reference lower limit value DPLL (step S12). If both of the answers to steps S11 and S12 are negative (NO), the DPF 12 is determined be normal, and the process ends immediately.

If the answer to step S11 or S12 is affirmative (YES), the process proceeds to step S13, in which the fail-safe action is performed. For example, the regeneration process of the DPF 12 and the operation in the engine operating condition (the high-load and high-speed engine operating condition), wherein the natural regeneration of the DPF 12 is performed, are inhibited. The high-load and high-speed engine operations are inhibited by limiting the fuel injection amount and the engine rotational speed NE. Since the pressure difference DP, detected by the pressure difference sensor 23, is not in the normal range (between the reference lower limit value DPLL and the reference upper limit value DPLH), calculation accuracy of the particulate accumulation amount, that is calculated based on the pressure difference DP detected by the pressure difference sensor 23, may decrease, resulting in the estimation that the particulate accumulation amount is too great or too small, even if the abnormality is caused, not by a blockage or a leak, but by the frozen state of the DPF 12. Therefore, in the present embodiment, when the detected pressure difference DP is not in the normal range, the fail-safe action described above is performed. Accordingly, the regeneration process is prevented from being performed in the condition where particulates are excessively accumulated in the DPF 12. Furthermore, the regeneration process is prevented from occurring when the unnecessary number of times execution of the regeneration process would provide or result in the undesirable occurrence of degradation of fuel consumption and exhaust characteristic.

In step S14, it is determined whether the non-freeze flag FNFZ is set to "1". If the answer to step S14 is negative (NO), the process ends immediately without forwarding the error notification signal to the driver. If the abnormality, that the pressure difference DP detected by the pressure difference sensor 23 is not in the normal range, is caused by the freeze, the DPF 12 itself is not abnormal. Accordingly, the pressure difference DP will return to the normal range by continuing a comparatively high load engine operation for a few minutes. Therefore, giving an unnecessary feeling of insecurity to the driver can be avoided without erroneously forwarding the error notification signal to the driver.

On the other hand, if the non-freeze flag FNFZ is set to "1", i.e., it is confirmed that the pressure difference sensor 23 is in the non-frozen state, the error notification signal is forwarded to the driver (a warning lamp is turned on or a warning sound is output) (step S15). The error notification signal may be performed distinctively corresponding to the two cases: the case where the pressure difference DP is greater than the reference upper limit value DPLH and the case where the pressure difference DP is less than the reference lower limit value DPLH. For example, if the pressure difference DP is greater than the reference upper limit value DPLH, the error notification signal that a blockage is present in the DPF is forwarded to the driver, and if the pressure difference DP is less than the reference lower limit value DPLL, the error notification signal that a leak is present in the DPF is forwarded to the driver.

As described above, in the present embodiment, even if the pressure difference DP is outside the normal range, the error notification signal is not forwarded to the driver. Only the fail-safe action is performed while there is a possibility that the abnormality is caused by the freeze. Therefore, it is possible to avoid giving an unnecessary feeling of insecurity to the driver while preventing abnormal rise in temperature of the DPF 12 or degradation of the fuel consumption or the exhaust characteristic.

Further, it is not easy to determine the frozen state of the pressure difference sensor 23 because the condition of air, such as the atmospheric temperature, and the like, and an amount of condensed water around the pressure difference sensor 23 or in the pressure difference detection passage 14 affect whether the pressure difference sensor 23 is in the frozen state. In contrast, the non-frozen state can be determined comparatively easily and accurately. Therefore, using both determination results of the non-frozen state of the pressure difference sensor and the abnormality of the DPF 12, based on the detected pressure difference DP, makes it possible to accurately determine the abnormality with a simple configuration.

In the present embodiment, the ECU 20 constitutes the non-frozen state determining means, the abnormality determining means, and the fail-safe process means. Specifically, the process of FIG. 2 corresponds to the non-frozen state determining means. Steps S11, S12, S14, and S15 of FIG. 3 correspond to the abnormality determining means. Step S13 of FIG. 3 corresponds to the fail-safe process means.

The present invention is not limited to the embodiment described above, and various modifications may be made. For example, in the embodiment described above, the exhaust gas temperature sensor 24 is mounted downstream of the DPF 12. However, the position of the exhaust gas temperature sensor 24 is not limited to this point. Alternatively, the exhaust gas temperature sensor 24 may be disposed upstream of the DPF 12 or upstream of the catalytic converter 11. However, it is preferable to dispose the exhaust gas temperature sensor 24 immediately downstream of the DPF 12. Since the exhaust gas temperature on the downstream side of the DPF 12 is lower than that on the upstream side of the DPF 12, water may possibly freeze on the downstream side of the pressure difference sensor 23 in the pressure difference detection passage 14 even if the frozen state disappears on the upstream side of the pressure difference sensor 23 in the passage 14. Therefore, by detecting the exhaust gas temperature on the downstream side rather than the upstream side of the DPF 12, the non-frozen state determination can be performed on the safer side.

Further, the coolant temperature TW, or a parameter indicative of the engine load, such as the accelerator pedal depressing amount AP detected by the accelerator sensor or the fuel injection amount, and the like, may be used as the parameter relevant to the exhaust gas temperature.

Further, in the above-described embodiment, the exhaust gas temperature is directly detected by the sensor. Alternatively, the exhaust gas temperature may be estimated according to the engine rotational speed NE, the engine load (the accelerator depressing amount, or the fuel injection amount), the intake air flow rate GA, an intake air temperature, and the like.

Further, as the parameter relevant to the atmospheric temperature, for example, the coolant temperature TW at cold start of the engine 1, or the intake air temperature, can be used.

Further, the present invention can also be applied to an exhaust gas purifying apparatus for a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, comprising:
   a filter provided in an exhaust system of said engine for trapping particulates in exhaust gases;
   an atmospheric temperature sensor that detects an atmospheric temperature;
   an exhaust gas temperature sensor that detects an exhaust gas temperature of said engine;
   a pressure difference sensor for detecting a pressure difference between an upstream side pressure of said filter and a downstream side pressure of said filter;
   non-frozen state determining means for determining a non-frozen state of said pressure difference sensor based on a first parameter corresponding to the detected exhaust gas temperature of said engine and a second parameter corresponding to the detected atmospheric temperature; and
   abnormality determining means for determining an abnormality of said filter using a determination result obtained by said non-frozen state determining means.

2. The exhaust gas purifying apparatus according to claim 1, wherein said non-frozen state determining means determines that said pressure difference sensor is in the non-frozen state when a condition where said first parameter is equal to or greater than a reference value continues over a predetermined time period.

3. The exhaust gas purifying apparatus according to claim 1, wherein said abnormality determining means determines that said filter is abnormal when said pressure difference sensor is determined to be in the non-frozen state by said non-frozen state determining means and an output of said pressure difference sensor is greater than a reference upper limit value or less than a reference lower limit value.

4. The exhaust gas purifying apparatus according to claim 3, further comprising fail-safe process means for inhibiting a regeneration process of burning the particulates trapped in said filter when the output of said pressure difference sensor is greater than the reference upper limit value or less than the reference lower limit value,
   wherein said abnormality determining means notifies a driver of a vehicle that is driven by said engine as to the existence of the abnormality when said filter is determined to be abnormal.

5. A method for determining abnormality of a filter provided in an exhaust system of an internal combustion engine, said filter trapping particulates in exhaust gases, said engine having a pressure difference sensor for detecting a pressure difference between an upstream side pressure and a downstream side pressure of said filter, an atmospheric temperature sensor for detecting an atmospheric temperature, and an exhaust gas temperature sensor for detecting an exhaust gas temperature of said engine; said method comprising the steps of:
   a) determining a non-frozen state of said pressure difference sensor based on a first parameter corresponding to the detected exhaust gas temperature of said engine and a second parameter corresponding to the detected atmospheric temperature; and
   b) determining an abnormality of said filter using a determination result obtained in said step a).

6. The method according to claim 5, wherein said pressure difference sensor is determined to be in the non-frozen state when a condition where said first parameter is equal to or greater than a reference value continues over a predetermined time period.

7. The method according to claim 5, wherein said filter is determined to be abnormal when said pressure difference sensor is determined to be in the non-frozen state and an output of said pressure difference sensor is greater than a reference upper limit value or less than a reference lower limit value.

8. The method according to claim 7, further comprising the steps of:
   c) inhibiting a regeneration process for burning the particulates trapped in said filter when the output of said pressure difference sensor is greater than the reference upper limit value or less than the reference lower limit value; and d) notifying the abnormality to a driver of a vehicle driven by said engine when said filter is determined to be abnormal.

9. An exhaust gas purifying apparatus for an internal combustion engine, comprising:
- a filter provided in an exhaust system of said engine for trapping particulates in exhaust gases;
- a pressure difference sensor for detecting a pressure difference between an upstream side pressure of said filter and a downstream side pressure of said filter;
- non-frozen state determining means for determining a non-frozen state of said pressure difference sensor based on at least one of a first parameter relevant to an exhaust gas temperature of said engine and a second parameter relevant to an atmospheric temperature;
- abnormality determining means for determining an abnormality of said filter using a determination result obtained by said non-frozen state determining means,
- wherein said abnormality determining means determines that said filter is abnormal when said pressure difference sensor is determined to be in the non-frozen state by said non-frozen state determining means and an output of said pressure difference sensor is greater than a reference upper limit value or less than a reference lower limit value; and
- fail-safe process means for inhibiting a regeneration process of burning the particulates trapped in said filter when the output of said pressure difference sensor is greater than the reference upper limit value or less than the reference lower limit value,
- wherein said abnormality determining means notifies a driver of a vehicle that is driven by said engine as to the existence of the abnormality when said filter is determined to be abnormal.

10. The exhaust gas purifying apparatus according to claim 9, wherein said non-frozen state determining means determines that said pressure difference sensor is in the non-frozen state when a condition where said first parameter relevant to the exhaust gas temperature is equal to or greater than a reference value continues over a predetermined time period.

11. A method for determining abnormality of a filter provided in an exhaust system of an internal combustion engine, said filter trapping particulates in exhaust gases, said engine having a pressure difference sensor for detecting a pressure difference between an upstream side pressure and a downstream side pressure of said filter, said method comprising the steps of:
a) determining a non-frozen state of said pressure difference sensor based on at least one of a first parameter relevant to an exhaust gas temperature of said engine and a second parameter relevant to an atmospheric temperature;
b) determining an abnormality of said filter using a determination result obtained in said step a),
wherein said filter is determined to be abnormal when said pressure difference sensor is determined to be in the non-frozen state and an output of said pressure difference sensor is greater than a reference upper limit value or less than a reference lower limit value;
c) inhibiting a regeneration process for burning the particulates trapped in said filter when the output of said pressure difference sensor is greater than the reference upper limit value or less than the reference lower limit value; and
d) notifying the abnormality to a driver of a vehicle driven by said engine when said filter is determined to be abnormal.

12. The method according to claim 5, wherein said pressure difference sensor is determined to be in the non-frozen state when a condition where said first parameter relevant to the exhaust gas temperature is equal to or greater than a reference value continues over a predetermined time period.

* * * * *